United States Patent [19]
Davies

[11] Patent Number: 5,717,487
[45] Date of Patent: Feb. 10, 1998

[54] COMPACT FAST IMAGING SPECTROMETER

[75] Inventor: Donald W. Davies, Torrance, Calif.

[73] Assignee: TRW Inc., Redondo Beach, Calif.

[21] Appl. No.: 713,889

[22] Filed: Sep. 17, 1996

[51] Int. Cl.[6] .................................................. G01J 3/28
[52] U.S. Cl. .................................................. 356/328
[58] Field of Search .................. 356/326, 328, 356/330–334, 307, 308; 250/339.07, 339.01, 339.02

[56] References Cited

U.S. PATENT DOCUMENTS

| | | | |
|---|---|---|---|
| 2,607,899 | 8/1952 | Cary et al. | 356/326 |
| 3,011,391 | 12/1961 | Fastie | 356/334 |
| 4,717,254 | 1/1988 | Masuda | 356/334 |
| 5,589,717 | 12/1996 | Chav | 356/328 |

FOREIGN PATENT DOCUMENTS

| | | | |
|---|---|---|---|
| DE2758141 | 6/1979 | Germany | 356/328 |

OTHER PUBLICATIONS

Denton et al., "Charge —Injection and C Large–Coupled Devices in Practical Chemical Analysis," American Chemical Society 1983, pp. 12–14t.

*Primary Examiner*—K. Hantis
*Attorney, Agent, or Firm*—Michael S. Yatsko; Ronald M. Goldman

[57] ABSTRACT

A spectrometer construction incorporates a single lens system (11) to both focus light input to the spectrometer on a diffraction grating (9) and to focus the light dispersed by the diffraction grating into separate spectral constituents back through that lens onto an image plane (15) for processing. Ordinary photographic lenses with fast lenses of f2 or better are able to serve as the lens system, thereby providing a higher quality system at lower cost than previously possible. With the light path doubling back through the spectrometer lens the space required for a spectrometer's optical system is reduced and results in a more compact spectrometer.

12 Claims, 1 Drawing Sheet

U.S. Patent  Feb. 10, 1998  5,717,487
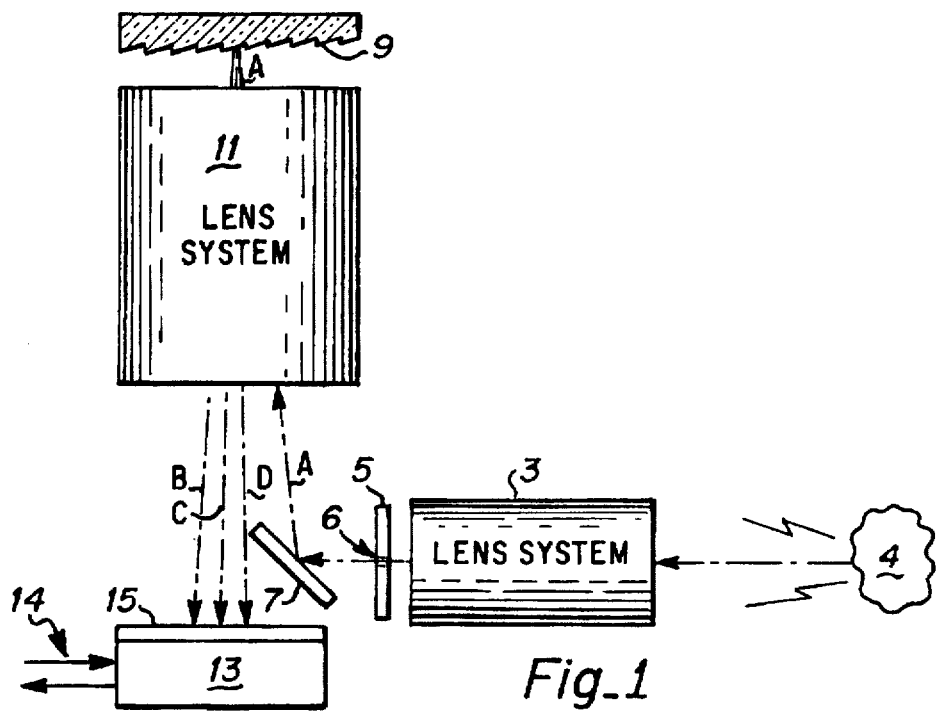
Fig_1
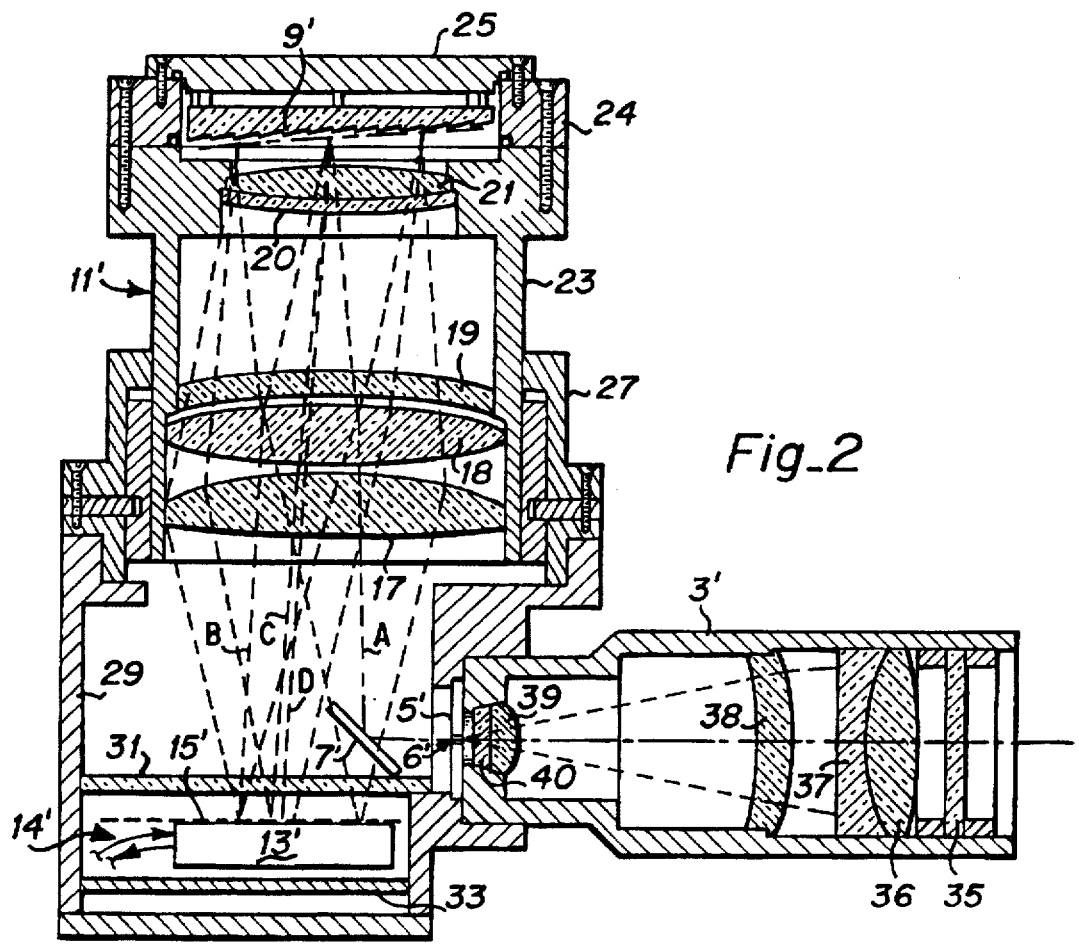
Fig_2

COMPACT FAST IMAGING SPECTROMETER

FIELD OF THE INVENTION

This invention relates to spectrometers, and, more particularly, to a new spectrometer design that is more compact in physical size and provides enhanced light imaging quality than previous designs.

BACKGROUND

A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured.

Each element of nature, molecular components, organic and inorganic compounds, living plants, man, animal and other substances is known to emit a unique spectrum that may be used as an indicium to identify the emitter. In past scientific work, the spectral analyses of a host of known elements, molecules, materials, living plants, gases and the like, has been compiled into a library. That library enables objects and things to be identified solely by the spectrometric analysis of the light reflected therefrom.

Thus, as example, by examining the spectral content of light reflected from the distant planets, astronomers identified the constituent elements, such as iron, forming those planets; by examining the spectral content of Gases emitted by factory smokestacks, scientists determine if pollutants are being emitted in violation of law or regulation; by examining the spectral content of land, the environmental engineer is able to determine the botanical fertility of a region and its mineral content, and, with subsequent observations, to determine the change in the environment with time; and by examining the spectral content of light reflected in multiple scans over a geographic region, military personnel identify camouflaged military equipment, separate from plant life, in that geographic region. The foregoing represent but a small number of the many known uses of this useful scientific tool.

Certain components are basic to all spectrometers, regardless of the field or industry in which it is applied: It contains a slit for admitting a narrow strip of light into the spectrometer for analysis; an optical system containing reflective or refractive surfaces for routing that light within the spectrometer, a diffraction grating or the like which disperses the incident light into spacially separate spectral components; and a lens or mirror system for focusing the dispersed light onto a focal plane, the image plane, whereby the spectral components are separately longitudnally arranged at the focal plane in order of wavelength.

Those spectrometers used to analyze an image of an object also contain an optical lens system or, as variously termed, a telescope, to pick up an entire image of light emanating from an object being observed, much as the lay person does with his photographic reflex camera, and focus that image at the light slit. The optical system is positionable and by pointing that system to different positions various portions of the image can be scanned, one slice at a time.

The spectral lines obtained at the focal plane are recorded on either photographic film, placed on that focal plane, and later developed, or, in more modern spectrometers, is recorded on a charge coupled device, "CCD", the "pick up" or image sensor that is also used in modern color television cameras and camcorders. In the latter the CCD is electronically read out by associated video circuits and the results displayed on a cathode ray tube color monitor and/or is recorded digitally in memory by a digital computer. By comparing the spectral results obtained on the CCD with the spectral identification information catalogued in its library memory, a computer can automatically identify and display to the operator the identification of the object whose light emission is being thus analyzed. In many instances an experienced operator viewing the light spectrum displayed on a cathode ray tube display is capable of identifying the material or object from personal memory.

The light handling capability of the spectrometer's optical system differs for different applications. For applications dealing principally with light within the visible light spectrum, the optical system need only accurately focus and process light spectra whose wavelength fall in the range of 0.4 micrometers to 0.65 micrometers, which is a less expensive system. For more exotic applications, such as in military and astronomy applications, where cost is often a secondary factor, the optical systems contain more expensive lenses, referred to as achromatic lenses, that are capable of handling light over the entire range of 0.4 micrometers to 0.9 micrometers in wavelength, covering the ultra-violet through infra-red regions of the light spectrum. And still other spectrometers having different types of focal planes, operate and even longer wavelengths, from 1.0 to 5.0 microns.

In order to obtain good image quality over the length of a fairly long slit, spectrometers have been relatively "slow" in the sense used by those familiar with photographic lenses. Good quality imaging requires high order optical corrections in the lenses. Those high order optical corrections were not usually achievable with the limited number of degrees of freedom available in past spectrometer designs. Although "high speed" lenses, such as f2.8 and f3.5 may be found in some prior spectrometers the quality of the spectral line images was not good. As a consequence, the better quality spectrometers that were capable of obtaining images of acceptable quality employed lenses in the optical system that were slower, of at least f4, a reference well known to those familiar with photographic lenses.

A slow lens does not gather a large amount of light and, in use, longer exposure times are required to produce satisfactory recording of the spectral image on film. For a given intensity of light received by the spectrometer, a faster lens permits the "picture" of that light to be taken more quickly. And, where the level of light is very low, a scanning system with the slow lens might not pick up that light at all, if the scanning speed is too great.

For environmental analysis an aircraft is typically employed to fly over a region of predefined area carrying a spectrometer to inspect light reflected from the ground below in narrow slices or strips. On board equipment associated with the spectrometer simultaneously processes each strip. A faster lens system has obvious benefits in that application. With a faster lens system, the aircraft can travel over the terrain at a much faster speed, allowing the inspection to be completed more quickly, or, alternatively, allowing a greater sized region to be covered in a during the daylight hours. Alternatively, the aircraft can continue its inspection of the terrain even as the ambient light levels fall, around sundown.

Thus, one object of the present invention is to provide a spectrometer design for producing high quality spectral images that includes a fast optical system. Another object of the invention is to provide a spectrometer whose optical system incorporates commercially available photographic lenses. And, a further object of the invention is to produce an affordable and fast spectrometer.

Existing spectrometers for the most part are somewhat bulky in size. For those who transport spectrometers into the field to conduct on-site inspections, the more compact in size, the greater the spectrometer's portability. The equipment can be more easily used. And in geo-satellites space and remotely piloted aircraft is always at a premium. Even in the laboratory, where size is not usually a limitation to installation and use of the equipment, any space saving is a benefit, freeing up space for other use.

Accordingly, a still further object of the invention therefor is to provide a spectrometer construction which is more compact in size than most present spectrometers.

SUMMARY OF THE INVENTION

In accordance with the foregoing objects, the novel spectrometer construction is characterized by a new optical system, one that allows the light path to double back through the spectrometer lens system. Light input to the spectrometer propagates in one direction to a diffraction grating, which disperses the light into its spectral constituents and reflects those constituents. The reflected dispersed light propagates in the reverse direction back through that lens. The lens focuses those spectral components at the lenses image plane, where those spectral components are dispersed along the image plane. At that location the light spectra is monitored or recorded.

The foregoing construction eliminates a separate space consuming optical path. Moreover the lens system takes advantage of existing photographic lens design. Fast lens designs common to photographic lenses, may serve as the spectrometer lens in the foregoing system. For the least expensive version that examines only a limited spectral range, an ordinary photographic lens is incorporated for that lens system.

BRIEF DESCRIPTION OF THE DRAWINGS

In the Drawings:

FIG. 1 is a pictorial view of the components of a new image spectrometer constructed in accordance with the invention; and FIG. 2 is a more detailed pictorial partial section view of the components of another embodiment of the new spectrometer.

DETAILED DESCRIPTION OF THE PREFERRED EMBODIMENTS

Reference is made to FIG. 1, which illustrates the elements of the new imaging spectrometer in pictorial form. The spectrometer includes a telescopic imaging lens 3; a slit or, as variously termed, light slitter 5; a flat reflecting mirror 7; a diffraction grating 9; another telescopic imaging lens 11, hereinafter referred to the spectrometer lens; a focal plane; and a charge coupled type video image sensor 13, whose photosensitive face is located at the lenses image plane 15.

In operation the objective end of telescopic lens 3 is directed to an object 4, whose light emanations are to be dissected and analyzed, and the image issues at the lenses back or image end where the image is focused upon light slitter 5. Telescopic lens 3 is actually a multi-lens system of conventional type, a telephoto lens, as example, well known to photographers, or a familiar telescope. The lens may be adjustable in the customary respects, but those known structural features of common telephoto lenses are not necessary to an understanding of the invention and are not further described.

Light slitter 5, located behind lens 3, to the left in the figure, is a known device that contains an elongate narrow slit 6 through its surface. In this figure that slit extends normal to the plane of the sheet of drawing. The slitter allows only a slice of the image received from telescopic lens 3 to pass through to the opposite side of the light slitter. The slice of light, a, is incident upon mirror 7 and is reflected thereby into the image plane end or back end of spectrometer lens 11. By rotating the line of sight of the entire assembly, or by movement of the scene past a stationary assembly, such as by viewing the scene from an aircraft, an entire two-dimensional scene can be examined.

Spectrometer lens 11 is also actually a multi-lens system of conventional type, a telephoto lens, which is familiar to photographers. This lens is used to focus an image viewed at the lenses objective end upon an image plane behind the lenses rear or image plane end. The lens may be adjustable in the customary respects, but, as in the case of lens 3, those known structural features are not necessary to an understanding of the invention and are not further described.

The spectrometer lens collimates the light slice. That collimated light slice exits at the lenses objective end, where, as indicated by the dash lines, the light slice is incident upon diffraction grating 9.

The diffraction grating is a known optical device, readily available in the marketplace. It contains a grated surface, a surface that contains a parallel series of tapered flat surfaces inclined at an angle to the plane of the grating's base; that is, to the horizontal in the figure. Those tapered surfaces reflect light of different wavelengths at different angles relative to the plane of the grating's base or horizontal, thereby dispersing the light.

The different spectral constituents of the light are reflected from the grating at different angles to the surface, the latter of which are directly related to the spectra's wavelength. The diffraction grating spacially disperses the incident light slice received from spectrometer lens 11 and splits that light into its different spectral components, differing from one another in wavelength. Those reflected spectral components propagate from the grating back into the objective end of lens 11 at different angles, which depend upon the particular spectral ingredients of the incident light. The latter in turn depends on the spectral content of the light reflected from object 4 being inspected. In turn, lens 11 focuses those spectral components, b, c, and d, longitudnally along the surface of image plane 15, located behind the rear end of lens 11. Each point on the entrance slit gets focused to a separate line at the focus of the spectrometer.

The two dimensional image obtained at the image plane is a series of spectral lines, directed into the plane of the paper. Those spectral lines are spaced parallel to one another and more likely than not will vary in intensity. The video sensor 13 repeatedly scans the two dimensional image and electronically transmits the image via conventional electrical circuits, generally represented as 14, to associated video recording and display apparatus of conventional structure, not illustrated.

Reference is made to FIG. 2, which illustrates another embodiment of the invention in a partially sectioned side view. A greater number of mechanical support elements are illustrated than in the prior figure, although the relationship and size of the elements are not drawn to scale. In this embodiment, the spectroscope lens 11' comprises five lenses, 17, 18, 19, 20, and 21 which are supported in a cylindrical housing 23 in spaced relationship. The diffraction grating 9' is mounted in a grating mount 24 and covered by a grating mount cap 25. The mount 24 is attached to and supported by the front or objective end of lens 11', by means of screws, placing the diffraction grating in front of and in spaced relationship to lens 21.

Spectrometer lens 11' is supported in an adjustment ring assembly 27 comprising coaxial positioned cylindrical members. The adjustment ring assembly in turn is seated within the lower housing 29. The adjustment ring allows the lens to be adjusted vertically in position to properly focus the lens upon image plane 15.

The photosensitive image sensor, charge coupled device 13' is mounted on a small circuit board 33 that, in turn, is mounted to the spectrometer housing. The photosensitive surface of CCD 13' lies in the image plane 15' of spectrometer lens 11.

Reflecting mirror 7' is mounted on a post laterally displaced from the axis of spectrometer lens 11' and is adjacent the lower housing wall so as to receive and reflect light, a, inputted through light slit 5'.

Telescope 3' contains a spectral filter 35 to block wavelengths outside of the spectrometer's operating wavelength range and multiple lenses 36, 37, 38, 39 and 40 within a cylindrical envelope housing. The telescope lens 3' is screwed in the side of the lower housing member 29. Slit 5' is mounted at the image plane end of the telescope lens.

The spectrometer system illustrated in FIG. 2 provides better illustration of the mechanical housing and support members used for supporting the essential elements of the spectrometer in the described relationship. It is seen to contain essentially the same principal elements pictorially illustrated in the embodiment of FIG. 1.

The embodiment of FIG. 2 operates in essentially the same way as the earlier described embodiment, which need not be repeated to the same detail. To aid in understanding the light paths are illustrated by dotted lines a, b, c, and d. In contrast to amateur photograph lenses, the lens system available in a custom design of FIG. 2 may be achromatic lens, which extends the spectrometers operational spectrum.

It is appreciated that the foregoing description completely describes the invention. Although mechanical details of the lenses are not necessary to an understanding of the invention or its necessary description, some examples of such detail illustrate the ease in which the invention may be implemented in practice. In a practical embodiment applied to amateur astronomy, lens 3 was a home made 17.5 inch Newtonian telescope and lens 11 was a Vivitar f/3.5, 135 mm telephoto lens.

In a practical embodiment of the embodiment of FIG. 2, a spectrometer lens 11' was formed of the following components:

| Lens | Radius (mm) | Thickness (mm) | Glass |
|---|---|---|---|
| 17 | Infinity −66.40 | 11.00 | SK16 Schott |
| Spacing | | 1.0 | Air |
| 18 | 78.72 −158.90 | 11.00 | SK16 Schott |
| Spacing | | 3.0 | Air |
| 19 | −110.92 −280.97 | 3.0 | SF18 Schott |
| Spacing | | 15.0 | Air |
| 20 | 170.10 55.25 | 3.0 | SF18 Schott |
| Spacing | | 3.0 | Air |
| 21 | 154.89 −110.92 | 7.00 | SK16 Schott |
| Spacing to grating | | 5.00 | Air |

In the foregoing description of operation, the light is seen to essentially double back through the spectrometer lens. The diagonal mirror is positioned so that it does not block the light returning from the spectrometer. It is discovered that positioning the mirror partially overlying a portion of the image plane does not interfere with the spectral components, indicated in the figures by dotted lines b, c, and d, issuing from the lens 11.

It was also discovered that the multiple lenses in lens 11 do not reflect a significant portion of the light slice that is introduced into the back end of the lens in the foregoing operation.

It is also important to minimize reflections from the multiple lenses that form lens 11, avoiding reflecting a significant portion of the light slice that is introduced into the back end of the lens in the foregoing operation. Were such reflections significant, those reflections would be incident upon the image plane in the same areas on which the spectral components are focused and would thus interfere with the operation of the spectrometer and the measured results. To ensure that such reflections are minimized, the lenses in the optical system follow the conventional practice and include conventional anti-reflection coatings.

In the practical embodiment described using a Vivitar f/3.5, 135 mm telephoto lens in the optical system, it was discovered that the conventional anti-reflective coatings used in commercially available telephoto lens do not reflect a significant portion of the light slice that is introduced into the back end of the lens in the foregoing operation. The availability of reasonably priced photographic lenses ensures that spectrometer embodiments incorporating the invention can be produced at a modest price allowing more widespread availability and use for teaching of science in schools and by amateur scientists and astronomers.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A spectrometer for analyzing spectral content of incident light comprising:
   a spectrometer lens; said spectrometer lens having an objective end, an image plane end and a central axis and containing multiple lenses, with individual ones of said lenses being located at selected positions along said central axis;

light slitter means for receiving light incident on one side thereof and passing a narrow slice of that incident light to the other side thereof;

a telescopic imaging lens for focusing an image of light at said light slitter means;

mirror means;

said mirror means being disposed to one side of said light slitter means for receiving said narrow slice of incident light from said light slitter means and reflecting said narrow slice into said image plane end of said spectrometer lens, whereby said spectrometer lens collimates said narrow slice and issues said narrow slice from said objective end;

a diffraction grating disposed at said objective end of said spectrometer lens for receiving collimated light from said objective end and reflecting spectrally dispersed spectral lines of that light into said objective end;

an image plane, said image plane being disposed behind said image plane end of said spectrometer lens system and to one side of said mirror means for receiving spatially arranged straight spectral lines issuing from said image plane end of said spectrometer lens; and image pick up means for imaging a two dimensional area at said image plane, said image pick up means being positioned at said image plane to individually detect the illumination intensity of multiple portions of the length of each straight spectral line present at said image plane.

2. The invention as defined in claim 1, wherein said image pick up means comprises:

electronic camera means, said electronic camera means including a two dimensional photosensitive surface for receiving two dimensional images of light and outputting information of said received two-dimensional image in electronic form; and wherein said photosensitive surface is positioned at said image plane.

3. The invention as defined in claim 1, further comprising:

display means, coupled to said image pick up means, for displaying a visually perceptible two-dimensional display of an image picked up by said image pick up means.

4. The invention as defined in claim 3, wherein said said electronic camera means further comprises a charge-coupled device two-dimensional array, whereby the intensity of each portion of the length of each spectral line presented at said image plane is individually monitored.

5. The invention as defined in claim 2, wherein said electronic camera means comprises: a two dimensional array of infra-red light detectors, whereby the infra-red intensity of each portion of the length of each spectral line presented at said image plane is individually monitored.

6. The invention as defined in claim 2, wherein said image pick up means further comprises photographic film.

7. The invention as defined in claim 1, wherein said spectrometer lens comprises a multi-element f3.5, 135 millimeter telephoto lens.

8. The invention as defined in claim 4, wherein said spectrometer lens comprises a multi-element f3.5, 135 millimeter telephoto lens.

9. The invention as defined in claim 1, wherein said spectrometer lens comprises a multi-element f3.5, 135 millimeter telephoto lens and wherein said telescopic imaging lens comprises a 17.5 inch Newtonian lens.

10. A spectrometer for analyzing spectral content of incident light comprising:

a spectrometer lens; said spectrometer lens having an objective end, an image plane end, a central axis and multiple lenses;

light slitter means for receiving light incident on one side thereof and passing a narrow slice of that incident light to the other side thereof;

a telescopic imaging lens for focusing an image of light at said light slitter means;

mirror means;

said mirror means being disposed to one side of said light slitter means for receiving said narrow slice of incident light from said light slitter means and reflecting said narrow slice into said image plane end of said spectrometer lens, whereby said spectrometer lens collimates said narrow slice and issues said narrow slice from said objective end;

light dispersing means disposed at said objective end of said spectrometer lens for receiving collimated light from said objective end and reflecting spectrally dispersed spectral lines of that light into said objective end;

an image plane said image plane being disposed behind said image plane end of said spectrometer lens system and to one side of said mirror means for receiving a spacially arranged spectral lines issuing from said image plane end of said spectrometer lens; and image processing means for collecting a two dimensional image of said image plane containing each incident spectral line and processing said image.

11. The invention as defined in claim 10, wherein said image processing means further comprises: electronic camera means.

12. The invention as defined in claim 11, wherein said electronic camera means further comprises a two-dimensional array charge coupled device.

* * * * *